United States Patent
Yamamoto

(10) Patent No.: US 7,530,741 B2
(45) Date of Patent: May 12, 2009

(54) FLUID BEARING DEVICE AND SPINDLE MOTOR

(75) Inventor: Takeyoshi Yamamoto, Niihama (JP)

(73) Assignee: Panasonic Corporation, Osaka (JP)

( * ) Notice: Subject to any disclaimer, the term of this patent is extended or adjusted under 35 U.S.C. 154(b) by 161 days.

(21) Appl. No.: 11/106,572

(22) Filed: Apr. 15, 2005

(65) Prior Publication Data

US 2005/0232522 A1    Oct. 20, 2005

(30) Foreign Application Priority Data

Apr. 15, 2004  (JP)  ............... 2004-119681
Jun. 24, 2004  (JP)  ............... 2004-186433

(51) Int. Cl.
*F16C 32/06*  (2006.01)

(52) U.S. Cl. .................. 384/100; 384/107
(58) Field of Classification Search .......... 384/107, 384/112, 115, 123; 310/90; 360/99.08, 98.07
See application file for complete search history.

(56) References Cited

U.S. PATENT DOCUMENTS

| | | | | |
|---|---|---|---|---|
| 5,683,183 A | * | 11/1997 | Tanaka et al. ........... | 384/100 |
| 5,932,946 A | * | 8/1999 | Miyasaka et al. ......... | 384/100 |
| 6,000,850 A | * | 12/1999 | Takahashi et al. ........ | 384/114 |
| 6,108,909 A | * | 8/2000 | Cheever et al. .......... | 384/100 |
| 2002/0191873 A1 | * | 12/2002 | Rahman .................. | 384/107 |

FOREIGN PATENT DOCUMENTS

| | | | |
|---|---|---|---|
| JP | 59215239 A | * | 12/1984 |
| JP | 7-63220 | | 3/1995 |
| JP | 2003-65323 | | 3/2003 |
| JP | 2003333792 A | * | 11/2003 |

* cited by examiner

*Primary Examiner*—Thomas R Hannon
(74) *Attorney, Agent, or Firm*—Steptoe & Johnson LLP

(57) ABSTRACT

A fluid bearing device capable of responding to miniaturization while preventing an operating fluid such as a lubricating oil from leaking out to the outside. The fluid bearing device includes a shaft and a sleeve arranged on an outer periphery with respect to the shaft with a microscopic gap in between, and has an operating fluid filled in between the shaft and the sleeve. The shaft is formed by a sintered body, a radial dynamic pressure generating groove is formed on an outer peripheral surface of the shaft, and the sleeve is formed by a material not allowing the operating fluid to pass through. The shaft is thus covered by the sleeve formed by a material that does not penetrate the operating fluid such as lubricating oil from the outer periphery side, so that the operating fluid does not leak out to the outside even when the shaft is a porous body made of a sintered body.

4 Claims, 6 Drawing Sheets

FLUID BEARING DEVICE AND SPINDLE MOTOR

BACKGROUND OF THE INVENTION

1. Field of the Invention

The present invention relates to a fluid bearing device that utilizes dynamic pressure of a fluid, and a spindle motor having the fluid bearing device. The fluid bearing device of the present invention is applicable to fluid bearing devices that are particularly suitable for spindle motors of a hard disc drive and other disc drives, but is also applicable to other apparatuses.

2. Description of the Related Art

In a bearing device of a spindle motor used in a hard disc drive and the like, in place of a ball bearing device that has been conventionally used, a fluid bearing device that excels at rotating precision and that excels at sound silence than the ball bearing device is becoming widely used.

FIG. 11 is a cross sectional view of a main part of a conventional fluid bearing device disclosed in JP-A 2003-65323 (referred to as Patent Document 1) and JP-A 7-63220 (referred to as Patent Document 2). In the conventional fluid bearing device shown in FIG. 11, a bracket 53 made of a material that does not allow a lubricating oil serving as an operating fluid to pass through is provided at an outer periphery of a sleeve 52 configured by a sintered body and formed with a radial dynamic pressure generating groove 51 at an inner peripheral surface of a bearing hole. A shaft 54 is inserted in the bearing hole of the sleeve 52, and a radial fluid bearing is configured by the sleeve 52 and the shaft 54. A thrust plate 56 formed with a thrust dynamic pressure generating groove 55 is fixed at a bottom opening of the bracket 53. A thrust flange 57 is provided at a lower end of the shaft 54 so as to face the thrust plate 56, and a thrust fluid bearing is configured by the thrust flange 57 and the thrust plate 56. The lubricating oil serving as the operating fluid is filled in between the sleeve 52 and the shaft 54 and between the thrust flange 57 and the thrust plate 56, including a gap configuring the radial fluid bearing and the thrust fluid bearing.

In the configuration of the conventional fluid bearing device, the sleeve 52 is configured with a sintered body using a sintered metal material. The sintered body can form the radial dynamic pressure generating groove 51 by placing a sintered molded object in a metal mold and performing press molding. Thus, the radial dynamic pressure generating groove 51 can be formed at high precision with a simple step. That is, in the sleeve manufactured using a solid metal material that is not a sintered body, a groove must be formed by precise cut machining in the post-process. Thus compared to such, the sleeve 52 configured by the sintered body reduces the manufacturing cost as groove machining does not need to be performed in the post-process.

The sintered body has therein a great number of void pores. If the sleeve 52 is configured by the sintered body, the lubricating oil serving as the operating fluid may leak out to the outside through the void pores of the sleeve 52. As a result, the lubricating oil decreases and may affect the function as a fluid bearing. Further, the pressurized lubricating oil present in the radial dynamic pressure generating groove 51 may flow into the void pores of the sleeve 52 during the rotation of the motor, and the pressure generated by the dynamic pressure generating groove may be reduced thus lowering the rigidity of the bearing serving as the radial fluid bearing.

In order to solve the aforementioned problems, in the fluid bearing device of Patent Document 1, the sleeve 52 formed by the sintered body is surrounded by the bracket 35 formed with a material that does not pass the lubricating oil. The lubricating oil is thus prevented from leaking out to the outside through the void pores of the sleeve 52. In another conventional fluid bearing device disclosed in Patent Document 2, a glazing process is performed on the inner peripheral surface of the sleeve of the sintered body to block the void pores. This prevents the lubricating oil from leaking out from the radial dynamic pressure generating groove into the void pores of the sleeve during rotation, thus preventing the rigidity of the bearing of the radial fluid bearing from lowering.

JP-A 2003-333792 (referred to as Patent Document 3) discloses a configuration in which a shaft is formed by a sintered body where a sintered metal material is sintered and a lubricating oil is contained in the shaft of the sintered body. A sleeve to which the shaft is inserted is configured with a metal solid that does not penetrate the lubricating oil, and the shaft is supported in the sleeve so as to be lubricated and rotated by the lubricating oil. The bearing is referred not as a hydrodynamic bearing but as a cylindrical slide bearing. In this configuration, the shaft is formed by the sintered body instead of the sleeve. However, since the sleeve is formed with a material that does not penetrate the lubricating oil, the lubricating oil contained in the shaft does not leak out from the sleeve.

In the conventional fluid bearing device disclosed in Patent Document 1 and Patent Document 2, however, a bracket formed with a material that does not pass the lubricating oil must be disposed on the outer sides of the sleeve formed with the sintered body. Thus, the number of components increases, so that the number of manufacturing assembly processes increases and, also, the manufacturing cost increases. Further, in miniaturizing the hard disc drive, as has been recently desired, two components of the sleeve and the bracket are necessary and thus becomes difficult to miniaturize.

Further, in the conventional fluid bearing device disclosed in Patent Document 3, the cylindrical slide bearing is simply configured, and thus the rigidity of the bearing lowers as the porosity of a porous sintered body configuring a rotating shaft increases, and cannot respond to the lowering of the bearing rigidity.

SUMMARY OF THE INVENTION

The present invention has been made to solve the aforementioned problems and to provide a fluid bearing device and a spindle motor that can prevent an operating fluid such as a lubricating oil from leaking out to the outside, can reduce the number of components, can lower the number of manufacturing assembly processes and manufacturing cost, can respond to miniaturization of a hard disc drive and can satisfactorily maintain bearing rigidity.

The present invention is directed to a fluid bearing device including a shaft and a sleeve arranged on an outer periphery with respect to the shaft with a microscopic gap in between, and having an operating fluid filled in between the shaft and the sleeve. Herein, the shaft is formed by a sintered body, a radial dynamic pressure generating groove is formed on an outer peripheral surface of the shaft, and the sleeve is formed by a material that does not allow the operating fluid to pass through.

According to this configuration, since the shaft is surrounded by the sleeve formed by a material that does not penetrate the operating fluid such as the lubricating oil from the outer peripheral side, the operating fluid does not leak out to the outside even when the shaft is a porous body made of a sintered body. Further, a bracket and the like does not need to be disposed on the outer sides of the sleeve, and the function of the sleeve can be formed by a single member. Thus, compared to the conventional fluid bearing device requiring the bracket, the number of components can be reduced, the number of manufacturing assembly processes can be reduced and the manufacturing cost can be reduced. Moreover, the number of components can be reduced; therefore, a miniature spindle motor capable of responding to the demand for miniaturization of a hard disc drive can be realized. In manufacturing, the shaft and the radial dynamic pressure generating groove can be manufactured at high precision while saving labor by press molding and the like. The shaft is covered by the operating fluid, and the radial dynamic pressure generating groove is formed on the outer peripheral surface; therefore, an even generating pressure is applied to the inside of the shaft from the outer periphery by the radial dynamic pressure generating groove, thereby suppressing the operating fluid from flowing out from the porous part during dynamic pressure generation thus lowering the generating pressure.

The present invention is also directed to a fluid bearing device, in addition to the above configuration, including a thrust flange projecting outward in a radial direction from the shaft, and a thrust plate arranged at a position facing the thrust flange with a microscopic gap in between. Herein, the operating fluid is filled in between the shaft and the sleeve, or between the thrust flange, and the sleeve and the thrust plate, and the sleeve and the thrust plate are formed by a material that does not allow the operating fluid to pass through. According to this configuration, the thrust fluid bearing is configured to position regulate also in the thrust direction.

The thrust flange is formed by a sintered body and a thrust dynamic pressure generating groove is formed on the surface of the thrust flange, and the sleeve and the thrust plate may be formed by a material that does not allow the operating fluid to pass through.

According to this configuration, the shaft and the thrust flange can be integrally formed, thus enhancing the precision due to reduction in the number of components, and the radial dynamic pressure generating groove and the thrust dynamic pressure generating groove are simultaneously formed by the pressing step and the sintered step. Thus, the labor can be further saved and the cost can be reduced. It is to be noted that when manufacturing the shaft and the thrust flange separately, the thrust flange including the thrust dynamic pressure generating groove can be manufactured relatively inexpensively and at high precision.

The sleeve is formed by a sintered body and the inner peripheral surface of the sleeve is subjected to a glazing process, a coating process or a plating process, and the thrust plate may be formed by a material that does not allow the operating fluid to pass through. According to this configuration, the sleeve can also be formed by a sintered body to further reduce the cost.

The thrust flange may not be arranged, and a thrust dynamic pressure generating groove or a pivot bearing may be formed on the end face of the shaft thereby simplifying the configuration and reducing the manufacturing cost.

The present invention is also directed to a fluid bearing device including a shaft formed by a sintered body, and a sleeve arranged in a relatively rotatable manner with respect to the outer peripheral surface of the shaft with a microscopic gap in between, and having the operating fluid filled in between the shaft and the sleeve. Herein, the sleeve is configured by a material that does not allow the operating fluid to pass through, and the radial dynamic generating groove is formed on the inner peripheral surface of a hole of the sleeve to which the shaft is inserted.

According to the present invention, since the sleeve formed by a material that does not penetrate the operating fluid such as the lubricating oil is arranged around the shaft, the operating fluid does not leak out to the outside even when the shaft is a porous sintered body. The operating oil is immersed in the holes of the porous shaft with almost no space. In operation of this fluid bearing device, an even pressure is applied to the outer peripheral surface of the shaft by the radial dynamic pressure generating groove formed on the inner peripheral surface of the hole of the sleeve to which the shaft is inserted. Thus, lowering of generating pressure due to entering and exiting of the operating fluid to and from the porous shaft during dynamic pressure generation does not occur.

According to this configuration, since the shaft is formed by a sintered body, manufacturing of the shaft may be applied with a high precision machining method such as press molding and the machining becomes easier. Since the high precision radial dynamic pressure generating groove can be formed on the inner peripheral surface of the sleeve through roll forming, etching or electrochemical machining, a high precision fluid bearing device can be realized. Since the number of components is reduced, a miniature spindle motor suitable for miniaturization of a hard disc drive can be obtained by using this fluid bearing.

The sleeve and the thrust plate are formed by a material that does not allow the operating fluid to pass through, and the thrust flange is formed by a sintered body, and the thrust dynamic pressure generating groove may be formed on the surface of the thrust flange. Thus, the shaft and the thrust flange can be configured by integral molding, and the number of components is reduced and the precision is further enhanced. The thrust dynamic pressure generating groove that is not required as high machining precision as the radial dynamic generating groove can be simultaneously formed by the press and sintering steps; therefore, the machining step is simplified and the cost can be reduced. The thrust flange including the thrust dynamic pressure generating groove can be manufactured relatively inexpensively and at high precision even when the shaft and the thrust flange are separately manufactured.

In addition, the present invention is also directed to a fluid bearing device including a shaft formed by a sintered body, and a sleeve arranged in a relatively rotatable manner with respect to the outer peripheral surface of the shaft with a microscopic gap in between, and having the operating fluid filled in between the shaft and the sleeve. Herein, the sleeve is formed by a material that does not allow the operating fluid to pass through, the radial dynamic pressure generating groove is formed on the inner peripheral surface of the hole of the sleeve to where the shaft is inserted, a thrust plate which is arranged so as to face one end face of the shaft with a microscopic gap in between and formed by a material that does not allow the operating fluid to pass through is further provided, and the thrust dynamic generating groove is arranged on one of the opposing surfaces of the shaft.

As such, when the thrust dynamic pressure generating groove is formed directly on the end face of the shaft without providing the thrust flange, the configuration can be further simplified, the manufacturing cost can be reduced, and the fluid bearing device can be miniaturized.

DESCRIPTION OF THE PREFERRED EMBODIMENTS

Hereinafter, in accordance with embodiments of the present invention, a fluid bearing device and a spindle motor including the fluid bearing device will be described with reference to the drawings.

First Embodiment

Figure 1:
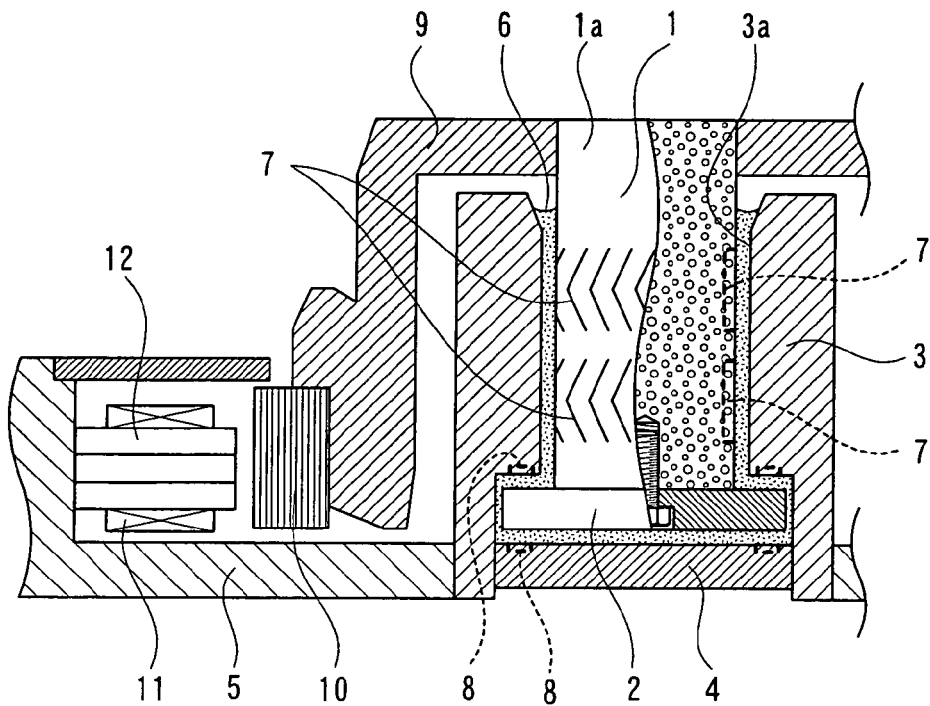
FIG. 1 is a cross sectional view of a spindle motor including a fluid bearing device according to a first embodiment of the present invention.

As shown in FIG. 1, a fluid bearing device of a spindle motor according to a first embodiment includes a shaft 1, a thrust flange 2 projecting outward in a radial direction from the shaft 1, a sleeve 3 arranged on an outer periphery of the shaft 1 with a microscopic gap in between, and a thrust plate 4 arranged at a position facing the thrust flange 2 with a microscopic gap in between.

The sleeve 3 is fixed at a base 5 of the spindle motor, and an inserting hole 3a is formed at a central portion. The shaft 1 is inserted to the inserting hole 3a with a microscopic gap in between, and a lubricating oil 6 serving as an operating fluid is filled into the microscopic gap between the shaft 1 and the sleeve 3. The thrust flange 2 is attached to a back end part of the shaft 1 so as to be integrally fixed by means of a screw or an externally fitted coupling. The thrust plate 4 is disposed so as to face a circular flat surface part of the thrust flange 2 and is fixed to the sleeve 3, and the lubricating oil 6 is filled into the gap between the thrust flange 2 and the thrust plate 4.

In this fluid bearing device, particularly, the shaft 1 is formed by a sintered body made of a metal sintered material. Further, a radial dynamic pressure generating groove 7 of a spiral-shape, a herringbone-shape pattern or the like is formed on the outer peripheral surface of the shaft 1 by press working to configure a radial fluid bearing. Herein, the metal sintered material is preferably configured by a sintered metal consisting of metal particles including, for example, iron or copper, but is not limited thereto. The sintered metal consisting of iron particles having stainless iron particles may be used. It is to be noted that the sintered body is a porous body having therein a great number of void pores. A method for manufacturing the same includes blending and mixing a metal powder and a lubricating material at a predetermined ratio, filling the mixture into a metal mold, and performing compression molding by pressing. Subsequently, the compressed powder molded body is heated over a predetermined time at a high temperature of a melting point or less and is then sintered. In the manufacturing steps, the radial dynamic pressure generating groove 7 may be formed by, for example, placing the sintered body in the metal mold and re-compressing, but is not limited thereto and may be formed in a compression molding step by the first pressing before sintering.

In this embodiment, the shaft 1 is formed by the sintered body, and the sleeve 3, the thrust flange 2 and the thrust plate 4 are formed by a material that does not pass the lubricating oil 6, that is, a material such as a metal solid or a synthetic resin that is not a porous body. Further, as shown in FIG. 1, in this embodiment, a radial fluid bearing consisting of the radial dynamic pressure generating groove 7 is provided at two locations of a region on a back side and a region on an opening side at the outer peripheral surface of the shaft 1.

A thrust dynamic pressure generating groove 8 of a spiral-shape, a herringbone-shape pattern or the like is formed on at least one surface of the opposing surfaces of the thrust flange 2 or the thrust plate 4 to configure a thrust fluid bearing. Further, a thrust dynamic pressure generating groove 8 is formed on at least one surface of the surface of the thrust flange 2 adjacent to the back end part of the shaft 1 or the surface of the sleeve 3 facing such surface to configure a thrust fluid bearing. FIG. 1 shows a case in which the thrust dynamic pressure generating groove 8 is formed on the surface of the sleeve 3 facing the thrust flange 2 and the surface of the thrust plate 4.

A hub 9 serving as a rotating member, to which outer periphery a magnetic recording disc or the like is fixed, is externally fitted to a projecting side end part 1a projecting out from the opening of the sleeve 3 in the shaft 1 in a press-fit state. In this embodiment, a rotor magnet 10 is attached on an outer periphery of a part on the base side of the hub 9. A stator core 12, around which a stator coil 11 is wound, is attached to the base 5 so as to face the rotor magnet 10. A driving section of the spindle motor for applying a rotating driving force to between the shaft 1 and the sleeve 3 is configured by the rotor magnet 10 and the stator core 12.

The hub 9 and the base 5 are generally formed by a metal material such as aluminum and stainless steel, but may also be formed by synthetic resin, and thus are not limited by the type of material.

When the hub 9, the shaft 1, and the thrust flange 2 are rotatably driven by the driving section of the spindle motor, the dynamic pressure is generated at the lubricating oil 6 of the respective locations in a radial direction by the radial dynamic pressure generating groove 7 and in a thrust direction by the thrust dynamic pressure generating groove 8. The shaft 1 and the thrust flange 2 are rotatably supported in a non-contact state with respect to the sleeve 3 and the thrust plate 4 while maintaining a microscopic gap in between by the fluid bearings (radial fluid bearing and thrust fluid bearing).

According to this configuration, the shaft 1 is surrounded from the outer peripheral side by the sleeve 3 formed by a material that does not penetrate the lubricating oil 6, and thus the lubricating oil 6 does not leak out to the outside even when the shaft 1 is a porous body made of a sintered body. Therefore, reduction of the lubricating oil 6 caused by external leakage does not occur and thus the function as the fluid bearing is not affected from such disadvantage. A satisfactory reliability can be thus maintained. The bracket and the like do not need to be disposed on the outer sides of the sleeve 3, and the function of the sleeve 3 can be performed by a single member. Therefore, compared to the conventional configuration in which the bracket is necessary, the number of components can be reduced, the number of manufacturing assembly processes can be reduced and the manufacturing cost can be reduced. Further, the shaft 1 and the radial dynamic pressure generating groove 7 thereof can be manufactured with high precision while saving labor by press molding during manufacturing. The groove machining by precise cut machining as when using a general metal material does not need to be performed in the post-processing; thus, the manufacturing cost can be further reduced. Moreover, since the number of components can be reduced, a small spindle motor capable of responding to the demand for smaller hard disc drive can be realized.

The shaft 1 is covered with the lubricating oil 6, and the radial dynamic pressure generating groove 7 is formed on the outer periphery thereof; therefore, an even generating pressure is applied by the radial dynamic pressure generating groove 7 from the outer periphery toward the inside of the shaft 1. Accordingly, the lubricating oil 6 flowing out from the porous part during dynamic pressure generation thus lowering the generating pressure can also be prevented. Since the radial dynamic pressure generating groove 7 is formed on the shaft 1 formed by the sintered body, the surface area formed with the radial dynamic pressure generating groove 7 can be freely enlarged and the shape of the radial dynamic pressure generating groove 7 can be freely devised. Thus, the rigidity of the bearing can be satisfactorily maintained while maintaining high reliability.

Second Embodiment

Figure 2:
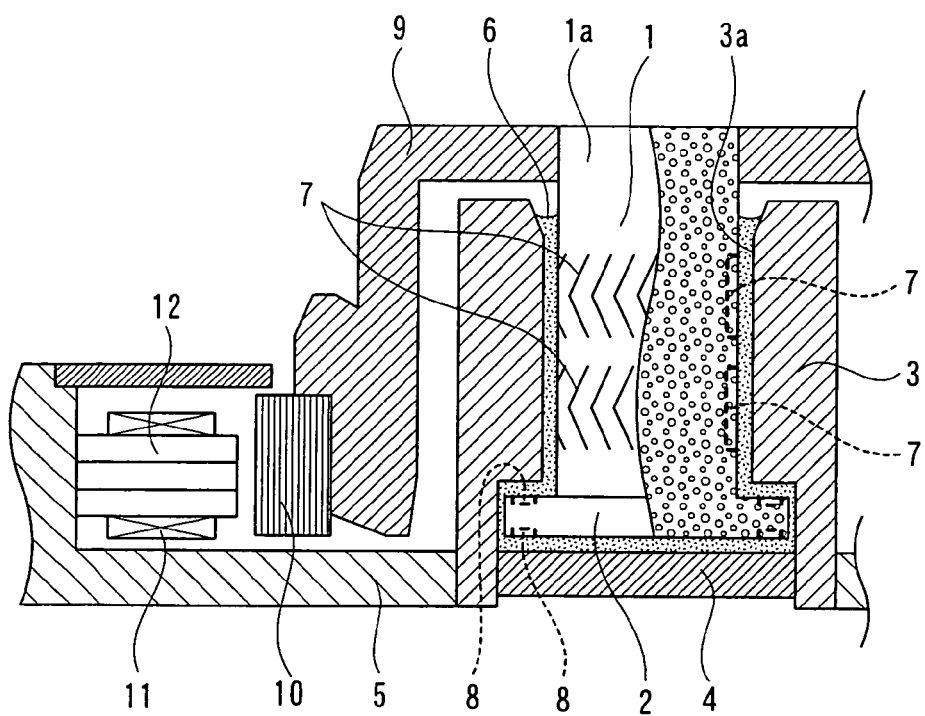
FIG. 2 is a cross sectional view of a spindle motor including a fluid bearing device according to a second embodiment of the present invention.

As shown in FIG. 2, in a fluid bearing device of a spindle motor according to a second embodiment, a shaft 1 and a thrust flange 2 are formed by a sintered body. The shaft 1 and the thrust flange 2 are integrally formed and manufactured in a manufacturing step.

A radial dynamic pressure generating groove 7 is formed on an outer peripheral surface of the shaft 1 to configure a radial fluid bearing, and a thrust dynamic pressure generating groove 8 is formed on upper and lower circular flat surface parts of the thrust flange 2 to configure a thrust fluid bearing.

A sleeve 3 and a thrust plate 4 are formed by a material that does not pass a lubricating oil 6, that is, a material such as a metal solid or a synthetic resin that is not a porous body.

According to this configuration, since the shaft 1 and the thrust flange 2 are integrally formed, the number of components is reduced and the precision is further enhanced. In addition, since the radial dynamic pressure generating groove 7 and the thrust dynamic pressure generating groove 8 are simultaneously formed by pressing and sintering steps, labor can be further saved and the cost can be reduced.

The shaft 1 and the thrust flange 2 are surrounded by the sleeve 3 and the thrust plate 4 from the outer sides; therefore, the lubricating oil 6 does not leak out to the outside even when the shaft 1 and the thrust flange 2 are porous bodies. The shaft 1 and the thrust flange 2 are covered with the lubricating oil 6 and the dynamic pressure generating grooves 7, 8 are formed on the outer periphery of the shaft 1 and the upper and lower surfaces of the thrust flange 2; therefore, an even generating pressure is applied to the inside of the shaft 1 and the inside of the thrust flange 2 by the dynamic pressure generating grooves 7, 8. Accordingly, the lubricating oil 6 does not flow out from the porous part during dynamic pressure generation thus lowering the generating pressure. The reliability thus does not lower from lowering of rigidity.

The shaft 1 and the thrust flange 2 may be separately manufactured. This case makes it possible to provide an advantage that the thrust flange 2 including the thrust dynamic pressure generating groove 8 can be manufactured relatively inexpensively with high precision.

Third Embodiment

Figure 3:
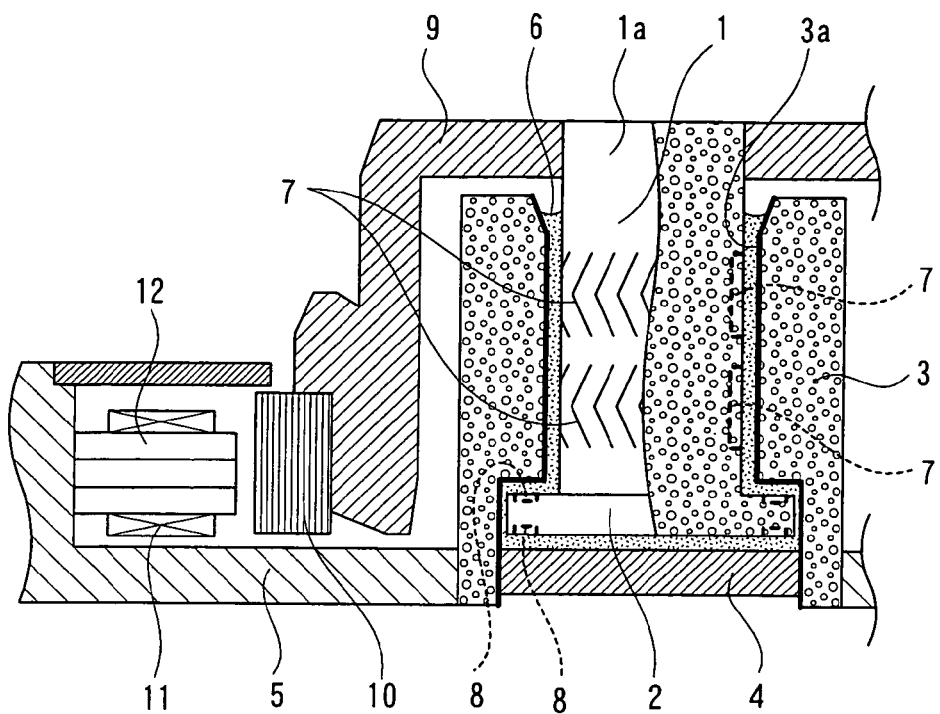
FIG. 3 is a cross sectional view of a spindle motor including a fluid bearing device according to a third embodiment of the present invention.

As shown in FIG. 3, in a fluid bearing device of a spindle motor according to a third embodiment, a shaft 1 is formed by a sintered body, a radial dynamic pressure generating groove 7 is formed on an outer periphery of the shaft 1 and a sleeve 3 is also formed by the sintered body. An inner peripheral surface (inserting hole 3*a*) of the sleeve 3 is subjected to a glazing process or a coating process or a plating process, so that a lubricating oil 6 does not pass through from the inner peripheral surface to the inside of the sleeve 3.

According to the aforementioned configuration, since at least the sleeve 3 is also formed by the sintered body, the cost can be further reduced. In addition, since the inner peripheral surface (inserting hole 3*a*) of the sleeve 3 is subjected to the glazing process or the coating process or the plating process, the lubricating oil 6 does not leak out even when the sleeve 3 is a porous body.

Fourth Embodiment

Figure 4:
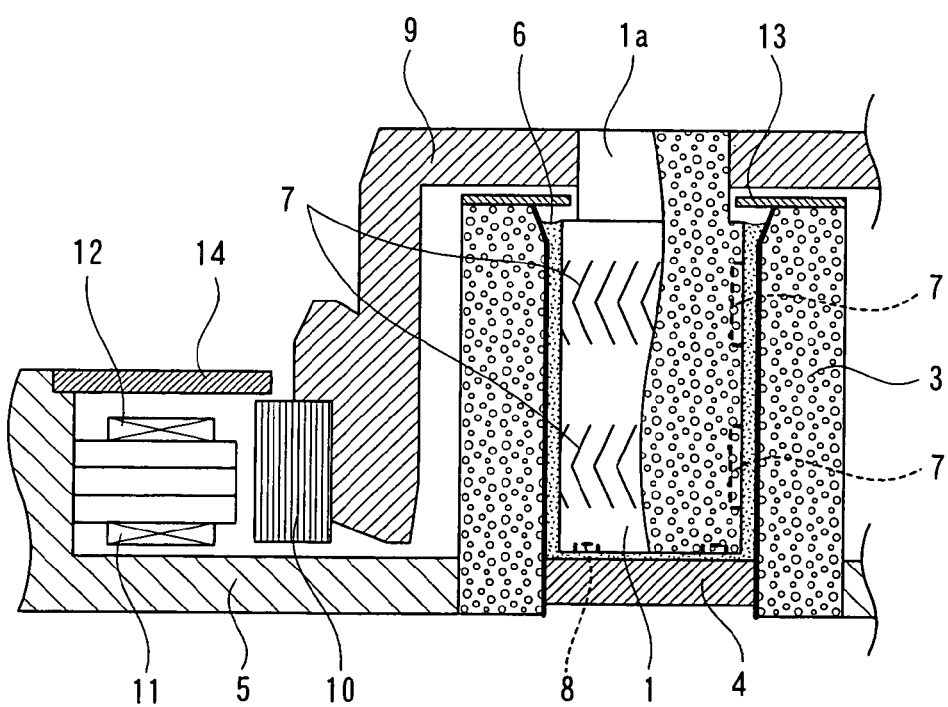
FIG. 4 is a cross sectional view of a spindle motor including a fluid bearing device according to a fourth embodiment of the present invention.

As shown in FIG. 4, in a fluid bearing device of a spindle motor according to a fourth embodiment, a thrust flange 2 is not provided and an inner diameter of a sleeve 3 is made constant. A thrust dynamic pressure generating groove 8 is formed at a bottom surface of a shaft 1. A step is formed at a projection side end part 1*a* of the shaft 1, a slip-out prevention member 13 of the shaft 1 is attached to the sleeve 3 so as to cover the step from above to prevent the shaft 1 from slipping out of the sleeve 3.

According to this configuration, the inner diameter of the sleeve 3 is constant; therefore, a glazing process can be easily performed.

The slip-out prevention member 13 may not be provided and a cover 14 for covering a motor driving section may also function to prevent slip-out of the shaft 1. The present invention is not limited by the presence and the locations of the slip-out prevention member.

Fifth Embodiment

Figure 5:
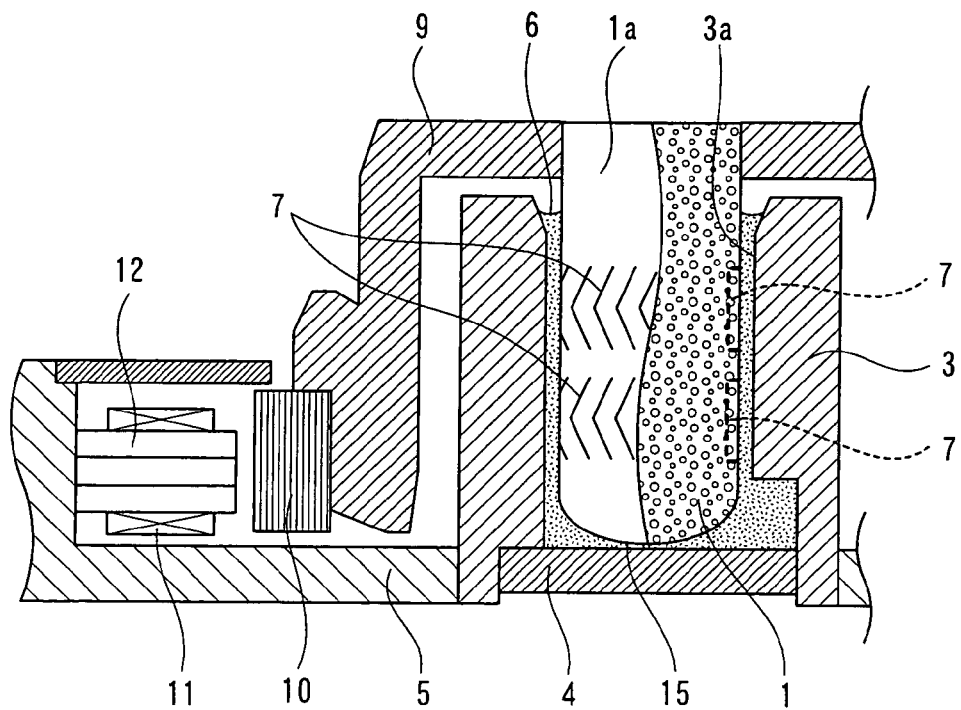
FIG. 5 is a cross sectional view of a spindle motor including a fluid bearing device according to a fifth embodiment of the present invention.

As shown in FIG. 5, in a fluid bearing device of a spindle motor according to a fifth embodiment, a shaft 1 is formed by a sintered body, a radial dynamic pressure generating groove 7 is formed on an outer peripheral surface of the shaft 1, and a pivot bearing 15 is formed at a lower end of the shaft 1.

According to this configuration, a part to be a thrust fluid bearing is changed to the pivot bearing 15; therefore, the configuration is simpler and the manufacturing cost is further reduced.

Sixth Embodiment

Figure 6:
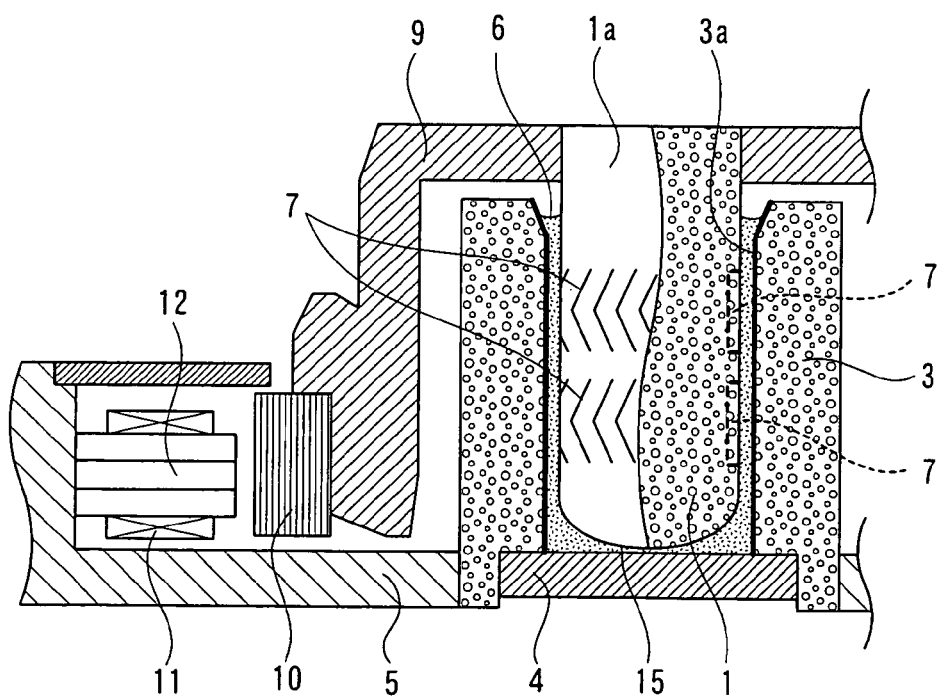
FIG. 6 is a cross sectional view of a spindle motor including a fluid bearing device according to a sixth embodiment of the present invention.

As shown in FIG. 6, in a fluid bearing device of a spindle motor according to a sixth embodiment, a shaft 1 is formed by a sintered body, a radial dynamic pressure generating groove 7 is formed on an outer peripheral surface of the shaft 1, a pivot bearing 15 is formed at a lower end of the shaft 1. Further, a sleeve 3 is formed by the sintered body, and an inner peripheral surface of the sleeve 3 is subjected to a glazing process or a coating process or a plating process.

According to the aforementioned configuration, a part to be a thrust fluid bearing can be changed to the pivot bearing 15 and at least the sleeve 3 can also be formed by the sintered body; therefore, the manufacturing cost can be further reduced.

Seventh Embodiment

Figure 7:
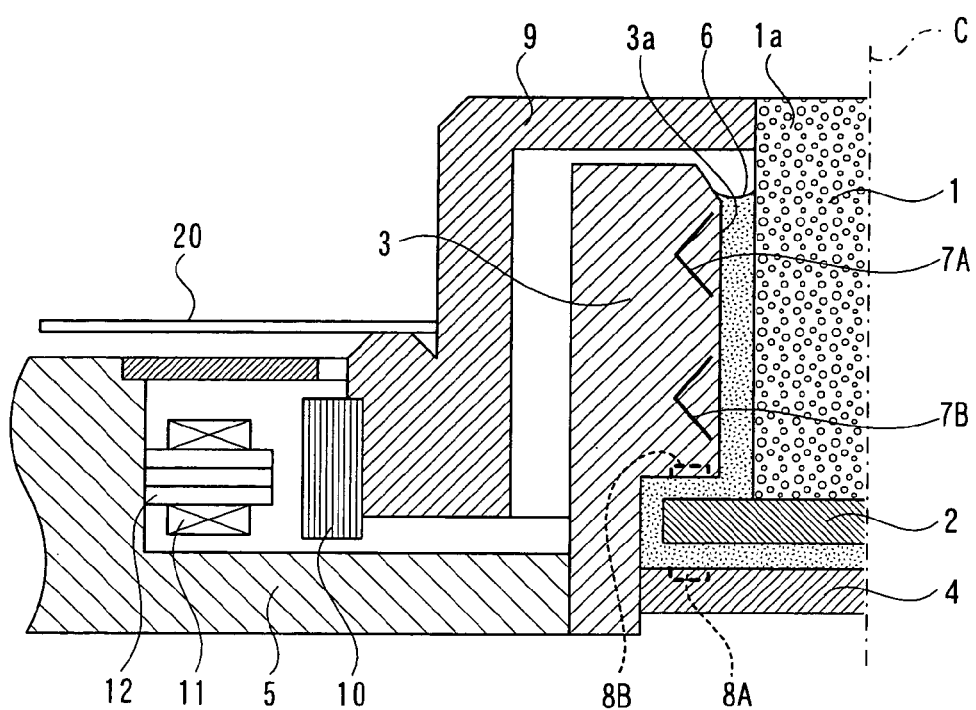
FIG. 7 is a cross sectional view showing the left half of a spindle motor including a fluid bearing device according to a seventh embodiment of the present invention.

Next, a fluid bearing device of a spindle motor according to a seventh embodiment of the present invention will be described with reference to FIG. 7. FIG. 7 is a cross sectional view of the left half of the spindle motor including the fluid bearing device according to the seventh embodiment. The right half is symmetric to the left half with respect to a center line C and thus is not shown in the figure. In FIG. 7, the fluid bearing device of this embodiment includes a shaft 1, a thrust flange 2 attached to a lower end of the shaft 1 in the figure and projected outward in a radial direction from the shaft 1, and a sleeve 3 having an inserting hole 3a to which the shaft 1 is inserted with a microscopic gap in between. A thrust plate 4 facing the thrust flange 2 with a microscopic gap in between is attached to the sleeve 3.

The sleeve 3 is fixed at a base 5 of the spindle motor. A lubricating oil 6 serving as an operating fluid is filled into the microscopic gap between the shaft 1 and the sleeve 3. The thrust flange 2 is integrally fixed to the shaft 1 by a screw or an externally fitted coupling. The lubricating oil 6 is also filled into the gap between the thrust flange 2 and the thrust plate 4.

Also in this fluid bearing device, the shaft 1 is formed by a sintered body in which a metal sintered material is sintered. The metal sintered material is preferably a sintered metal consisting of metal particles including, for example, iron or copper but is not limited thereto and may be iron sintered metal containing iron particles such as stainless steel. The sintered body is a porous body having therein a great number of void pores. The large and small white circles shown on the surface of the shaft 1 represent the void pores of the sintered body. Since the shaft 1 is a porous body, the lubricating oil 6 penetrates into the void pores of the shaft 1, but saturation occurs when the lubricating oil 6 is penetrated into all the void pores; thus, the lubricating oil 6 cannot be penetrated any more. A method for manufacturing the shaft 1 includes blending and mixing a metal powder and a lubricating material at a predetermined ratio. The mixture is then filled into a metal mold and compression molding is performed by pressing. The compression molded molding body is heated over a predetermined time at a temperature of a melting point and is then sintered.

In this embodiment, the shaft 1 is formed by the sintered body, but the sleeve 3, the thrust flange 2 and the thrust plate 4 are formed with a material that does not pass the lubricating oil 6, that is, a material such as a metal solid or a synthetic resin that is not a porous body. Radial dynamic pressure generating grooves 7A and 7B of a well known shape such as a spiral-shape or a herringbone-shape are formed on the inner peripheral surface of the inserting hole 3a of the sleeve 3 through a conventionally known techniques such as form rolling, etching, and electrochemical machining. In FIG. 7, the two radial dynamic pressure generating grooves 7A and 7B are shown at the cross section of the sleeve 3, but actually, a plurality of radial dynamic pressure generating grooves 7A and 7B are each provided on the inner peripheral surface of the inserting hole 3a of the sleeve 3. The figure is difficult to see if the radial dynamic pressure generating grooves 7A and 7B are shown on the inner peripheral surface 3a of the sleeve 3, and thus are schematically shown as in FIG. 7.

A thrust dynamic pressure generating groove 8A of a well known shape such as a spiral-shape or a herringbone-shape pattern is formed on at least one surface (upper surface of the thrust plate 4 in FIG. 7) of the opposing surfaces of the thrust flange 2 and the thrust plate 4 to configure a thrust fluid bearing. Further, a thrust dynamic pressure generating groove 8B is formed on at least one surface (lower surface of the sleeve 3 in FIG. 7) of the upper surface of the thrust flange 2 and the lower surface of the sleeve 3 facing the surface of the thrust flange 2 to configure a thrust fluid bearing.

A hub 9 serving as a rotating member is attached to a projecting end part 1a of the shaft 1 projecting out from an opening of the sleeve 3 in a press-fit state. A magnetic recording disc 20 or the like is attached to an outer periphery of the hub 9. A rotor magnet 10 is attached to an outer periphery of a part near the base 5 of the hub 9 in the spindle motor. A stator core 12, around which a stator coil 11 is wound, is attached to the base 5 so as to face the rotor magnet 10. A driving section of the spindle motor for applying a rotating driving force to between the shaft 1 and the sleeve 3 is configured by the rotor magnet 10 and the stator core 12.

When the hub 9, the shaft 1 and the thrust flange 2 are rotated by the driving section of the spindle motor, a dynamic pressure in a radial direction is generated in the lubricating oil 6 by the radial dynamic pressure generating grooves 7A and 7B, and a dynamic pressure in a thrust direction is generated by the thrust dynamic pressure generating grooves 8A and 8B. The fluid bearings (radial fluid bearing and thrust fluid bearing) are formed by these dynamic pressures, and the shaft 1 and the thrust flange 2 are rotated in a non-contact state with respect to the sleeve 3 and the thrust plate 4, respectively, while maintaining the microscopic gap in between.

Since the shaft 1 is inserted into the inserting hole 3a of the sleeve 3 formed by a material that does not penetrate the lubricating oil 6, the lubricating oil 6 does not leak out to the outside even when the shaft 1 is a porous body made of a sintered body. That is, the lubricating oil 6 is not reduced from leakage to the outside, and a satisfactory reliability can be maintained.

Figure 11:
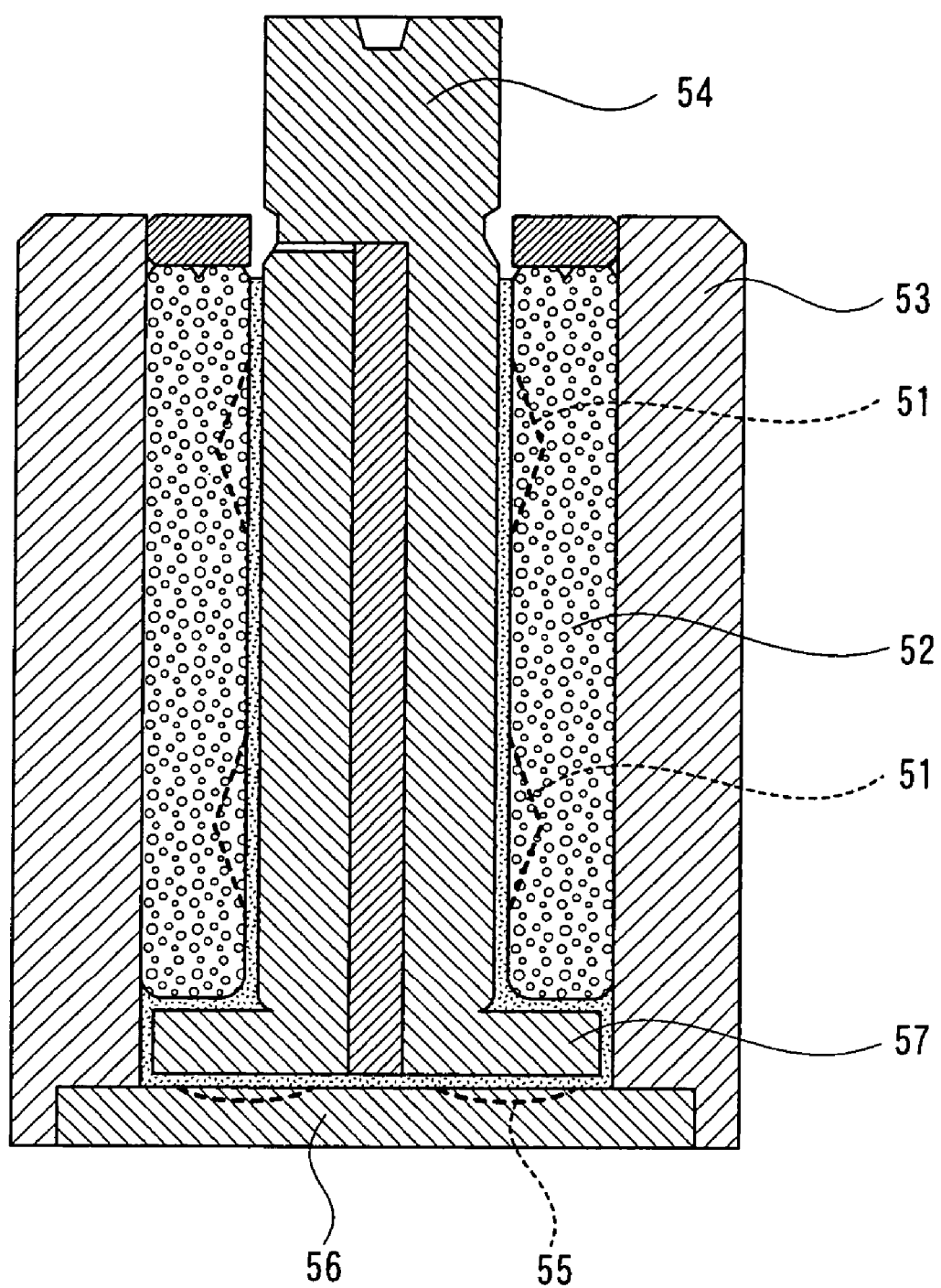
FIG. 11 is a cross sectional view of a spindle motor including a conventional fluid bearing device.

According to this embodiment, as in the conventional fluid bearing device shown in FIG. 11, the bracket 53 does not need to be disposed on the outer sides of the sleeve 52 and the sleeve 52 can be formed with a single member. Thus, compared to the configuration of the conventional fluid bearing device requiring the bracket, the number of components can be reduced, the number of manufacturing assembly processes can be reduced and manufacturing cost can be reduced.

In manufacturing, the shaft 1 can be manufactured at high precision with a simple step by press molding. Since the radial dynamic pressure generating grooves 7A and 7B are formed by form rolling, etching, electrochemical machining and the like on the inner peripheral surface of the sleeve 3 that is not a sintered body, the machining precision of the radial dynamic pressure generating grooves 7A and 7B is high. The number of components can be reduced in this embodiment as described above; therefore, a small spindle motor capable of responding to miniaturization of a hard disc drive can be provided.

Since the radial dynamic pressure generating grooves 7A and 7B are formed on the inner peripheral surface of the inserting hole 3a of the sleeve 3, an even pressure of the lubricating oil 6 is applied by the radial dynamic pressure generating grooves 7A and 7B to the outer peripheral of the shaft 1 covered with the lubricating oil 6 and the lubricating oil of the inside. Accordingly, the lubricating oil 6 entering to/exiting from the porous part of the shaft 1 during dynamic pressure generation thus lowering the generation pressure can be prevented. As a result, the rigidity of the bearing of the radial fluid bearing and the thrust fluid bearing can be satisfactorily maintained and high reliability of the fluid bearing device can be maintained.

Eighth Embodiment

Figure 8:
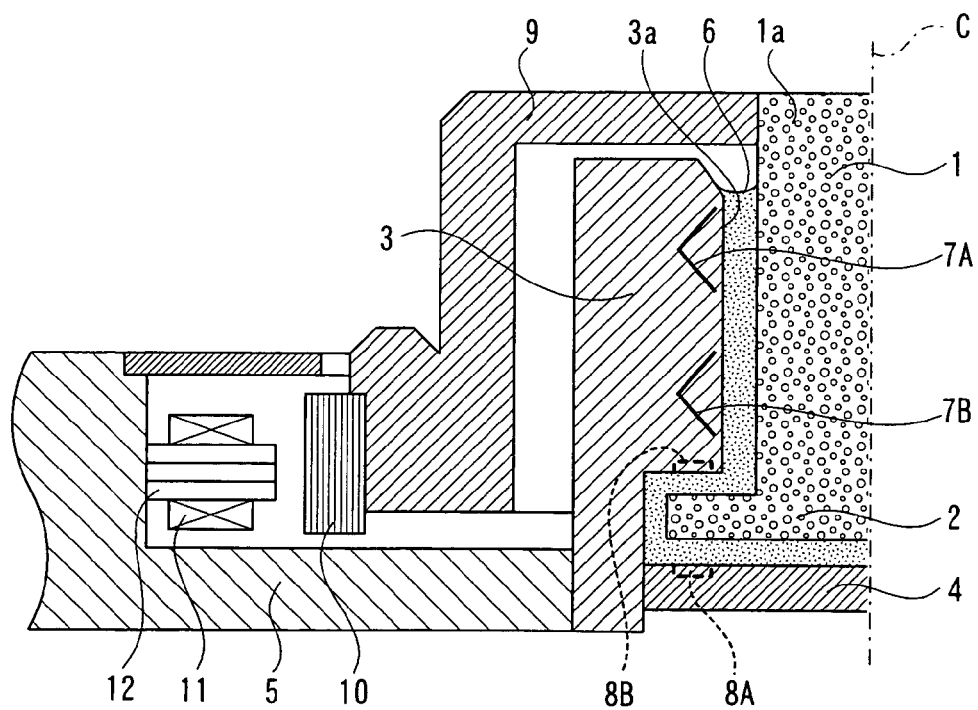
FIG. 8 is a cross sectional view showing the left half of a spindle motor including a fluid bearing device according to an eighth embodiment of the present invention.

A fluid bearing device of a spindle motor according to an eighth embodiment of the present invention will now be described with reference to FIG. 8. FIG. 8 is a cross sectional view of the left half of the spindle motor including the fluid bearing device according to the eighth embodiment. The right half is symmetrical to the left half with respect to a center line C and thus is not shown in the figure. A shaft 1 of this embodiment includes a thrust flange 2 of a sintered body formed integrally with the shaft 1 at a lower end in the figure. In a manufacturing step, the shaft 1 and the thrust flange 2 are simultaneously manufactured. Other configurations are the same as the seventh embodiment shown in FIG. 7. That is, a sleeve 3 and a thrust plate 4 are formed by a material that does not pass a lubricating oil 6, that is, a material such as a metal solid or a synthetic resin that is not a porous body. Well known radial dynamic pressure generating grooves 7A and 7B are formed on an inner peripheral surface of an inserting hole 3a of the sleeve 3 through conventional machining techniques such as form rolling, etching, and electrochemical machining. A thrust dynamic pressure generating groove 8B is formed on the surface of the sleeve 3 facing the thrust flange 2 and a thrust dynamic pressure generating groove 8A is formed on the surface of the thrust plate 4 facing the thrust flange 2 to configure a thrust fluid bearing.

According to this configuration, since the shaft 1 and the thrust flange 2 are integrally formed, the number of components can be reduced and the precision can be enhanced.

Also, the shaft 1 and the thrust flange 2 are surrounded by the sleeve 3 and the thrust plate 4 from the outer sides; therefore, the lubricating oil 6 does not leak to the outside even when the shaft 1 and the thrust flange 2 are made of a porous body. Further, the lubricating oil 6 is impregnated in the shaft 1 and the thrust flange 2. The dynamic pressure generating grooves 7A and 7B are formed on the inner peripheral surface of the inserting hole 3a of the sleeve 3, and the dynamic pressure generating grooves 8B and 8A are formed on the lower surface of the sleeve 3 and the upper surface of the thrust plate 4 each facing the thrust flange 2. In operation, an even pressure is applied by the dynamic pressure generating grooves 7A, 7B, 8A, and 8B to the inside of the shaft 1 and to the inside of the thrust flange 2. Accordingly, the lubricating oil 6 does not flow out through the porous parts during the dynamic pressure generation thus lowering the generating pressure, the rigidity of the bearing does not lower, and the reliability of the fluid bearing does not lower.

The shaft 1 and the thrust flange 2 may be manufactured in separate steps and then combined together. In this case, an advantage of manufacturing relatively inexpensively is obtained.

Ninth Embodiment

Figure 9:
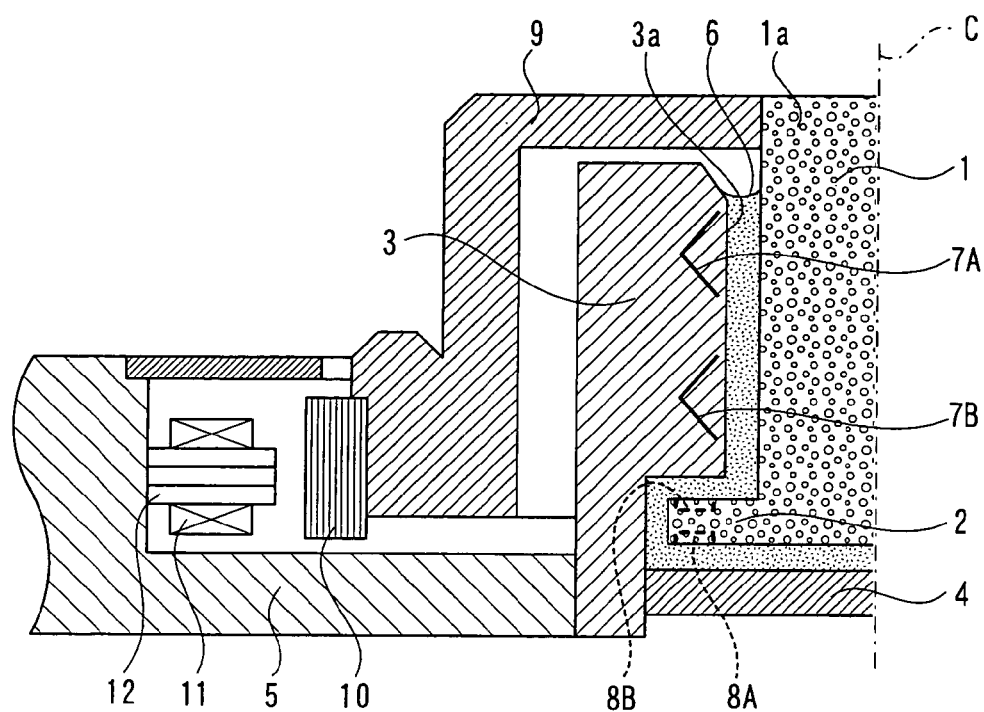
FIG. 9 is a cross sectional view showing the left half of a spindle motor including a fluid bearing device according to a ninth embodiment of the present invention.

A fluid bearing device of a spindle motor according to a ninth embodiment of the present invention will now be described with reference to FIG. 9. FIG. 9 is a cross sectional view of the left half of the spindle motor including the fluid bearing device according to the ninth embodiment. The right half is symmetrical to the left half with respect to a center line C and thus is not shown in the figure. As shown in FIG. 9, in the fluid bearing device of the spindle motor, a shaft 1 and a thrust flange 2 are formed by a sintered body. The shaft 1 and the thrust flange 2 are integrally molded and manufactured. Thrust dynamic pressure generating grooves 8A and 8B are formed on upper and lower surfaces (circular flat surface part) of a peripheral part of the thrust flange 2 to configure a thrust fluid bearing. Other configurations are the same as the seventh embodiment shown in FIG. 7; therefore, duplicate description will no be given herein.

A sleeve 3 and a thrust plate 4 are formed with a material that does not pass a lubricating oil 6, that is, a material such as a metal solid or a synthetic resin that is not a porous body. Well known radial dynamic pressure generating grooves 7A and 7B are formed on an inner peripheral surface of an inserting hole 3a of the sleeve 3 by conventional machining techniques such as form rolling, etching, and electrochemical machining.

In this fluid bearing device, since the shaft 1 and the thrust flange 2 are integrally formed, the number of components can be reduced and the precision can be enhanced. In addition, the thrust dynamic pressure generating grooves 8A and 8B are simultaneously formed by the pressing and sintering steps; therefore, the manufacturing steps is simplified and the cost is reduced. The machining precision as high as the radial dynamic pressure generating grooves 7A and 7B is not required for the thrust dynamic pressure generating grooves 8A and 8B. Accordingly, problems in terms of function does not arise even when the thrust dynamic pressure generating grooves 8A and 8B are provided on the thrust flange 2 made of a porous sintered body.

Tenth Embodiment

Figure 10:
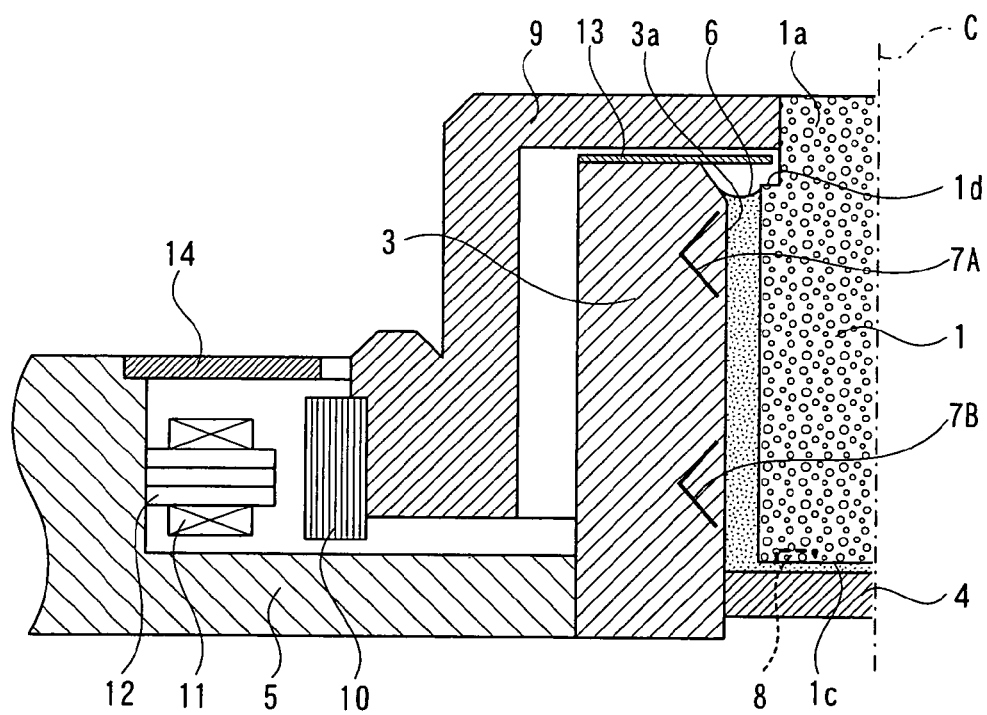
FIG. 10 is a cross sectional view showing the left half of a spindle motor including a fluid bearing device according to a tenth embodiment of the present invention.

A fluid bearing device of a spindle motor according to a tenth embodiment of the present invention will now be described with reference to FIG. 10. FIG. 10 is a cross sectional view of the left half of the spindle motor including the fluid bearing device according to the tenth embodiment. The right half is symmetrical to a left half with respect to a center line C and thus is not shown in the figure. As shown in FIG. 10, a shaft 1 of the fluid bearing device of the spindle motor does not include a thrust flange 2 that projects in a radial direction from a lower surface of the shaft 1 as shown in FIG. 9. The thrust dynamic pressure generating groove 8 configuring the thrust fluid bearing is formed on a bottom surface 1c of the shaft 1. A step 1d is formed at a projecting end part 1a of the shaft 1 and a slip-out prevention member 13 is attached to a sleeve 3 so as to cover the step 1d from above to prevent the shaft 1 from slipping out of the sleeve 3. Other configurations are the same as the configuration of the ninth embodiment.

In the configuration of this fluid bearing device, since an inner diameter of an inserting hole 3a of the sleeve 3 is constant, inner peripheral machining of the sleeve 3 and formation of radial dynamic pressure generating grooves 7A and 7B are easily performed.

It is to be noted that instead of providing the slip-out prevention member 13, a cover 14 for covering a motor driving section may also function to prevent slip-out of the shaft 1. The present invention is not limited by the presence and locations of the slip-out prevention member.

What is claimed is:

1. A fluid bearing device comprising a shaft and a sleeve arranged on an outer periphery of the shaft with a microscopic gap therebetween, and having an operating fluid filled in between the shaft and the sleeve, wherein the shaft is formed by a sintered body and a radial dynamic pressure generating groove is formed on an outer peripheral surface of the shaft by press working, and the sleeve is formed by a material not allowing the operating fluid to pass therethrough, wherein the radial dynamic pressure generating groove generates an even pressure from an outer periphery of the shaft radially toward an inside of the shaft.

2. The fluid bearing device according to claim 1, further comprising:

a thrust flange projecting outward in a radial direction from the shaft; and a thrust plate arranged at a position facing the thrust flange with a microscopic gap therebetween, wherein the operating fluid is filled in between the shaft and the sleeve, between the thrust flange and the sleeve, or between the thrust flange and the thrust plate, and the sleeve, the thrust flange and the thrust plate are formed by a material that does not allow the operating fluid to pass therethrough.

3. The fluid bearing device according to claim 1, wherein the radial dynamic pressure generating groove has a herringbone pattern.

4. A spindle motor comprising:

a fluid bearing device including a shaft and a sleeve arranged on an outer periphery of the shaft with a microscopic gap therebetween, and having an operating fluid filled in between the shaft and the sleeve; and a driving section for applying a rotating driving force between the shaft and the sleeve, wherein the shaft is formed by a sintered body, a radial dynamic pressure generating groove is formed on an outer peripheral surface of the shaft by press working, the sleeve is formed by a material that does not allow the operating fluid to pass through, and the radial dynamic pressure generating groove generates an even pressure from the outer peripheral surface of the shaft radially toward an inside of the shaft.

* * * * *